(12) United States Patent
Cooper

(10) Patent No.: US 7,469,871 B2
(45) Date of Patent: Dec. 30, 2008

(54) UNIVERSAL CLIPBOARD

(76) Inventor: David T. Cooper, 2824 Riviera Dr., Apt. C, Fairlawn, OH (US) 44333

( * ) Notice: Subject to any disclaimer, the term of this patent is extended or adjusted under 35 U.S.C. 154(b) by 0 days.

(21) Appl. No.: 11/048,546

(22) Filed: Feb. 1, 2005

(65) Prior Publication Data
US 2006/0175520 A1    Aug. 10, 2006

(51) Int. Cl.
*A47B 19/00* (2006.01)
(52) U.S. Cl. .................. 248/441.1; 248/459; 248/460; 248/453; 224/276
(58) Field of Classification Search .............. 248/441.1, 248/459, 460, 453; 224/411, 276; 108/44; 188/24.11; 422/245.1; 281/44, 45, 42; D12/177; D19/88; 292/DIG. 28
See application file for complete search history.

(56) References Cited

U.S. PATENT DOCUMENTS

| | | | | | |
|---|---|---|---|---|---|
| 1,593,166 | A | * | 7/1926 | Flach | 248/444 |
| 1,977,507 | A | * | 10/1934 | Edwards | 224/276 |
| 3,042,958 | A | * | 7/1962 | Spears | 16/84 |
| 3,952,988 | A | | 4/1976 | Easterly | |
| 4,453,788 | A | | 6/1984 | Russell | |
| D286,894 | S | * | 11/1986 | Haas et al. | D19/88 |
| D292,445 | S | * | 10/1987 | Judge | D12/420 |
| 4,974,805 | A | | 12/1990 | Douglas | |
| 5,060,581 | A | * | 10/1991 | Malinski | 108/44 |
| 5,385,283 | A | | 1/1995 | Shioda | |
| 5,413,035 | A | * | 5/1995 | Fernandez | 100/44 |
| D409,962 | S | * | 5/1999 | Demont | D12/177 |
| 6,062,145 | A | | 5/2000 | Lin | |

FOREIGN PATENT DOCUMENTS

JP           08282190 A   * 10/1996

* cited by examiner

*Primary Examiner*—J. Allen Shriver, II
(74) *Attorney, Agent, or Firm*—Buckingham, Doolittle & Burroughs, LLP

(57) ABSTRACT

A portable, collapsible clipboard which may be mounted to a vehicle steering wheel by an elastic strap or removed and carried by a provided shoulder strap. The clipboard includes two writing portions that are hingedly connected so that the clipboard can be folded in half or expanded to provide a larger writing surface. A latch is provided to keep the clipboard securely folded.

1 Claim, 5 Drawing Sheets

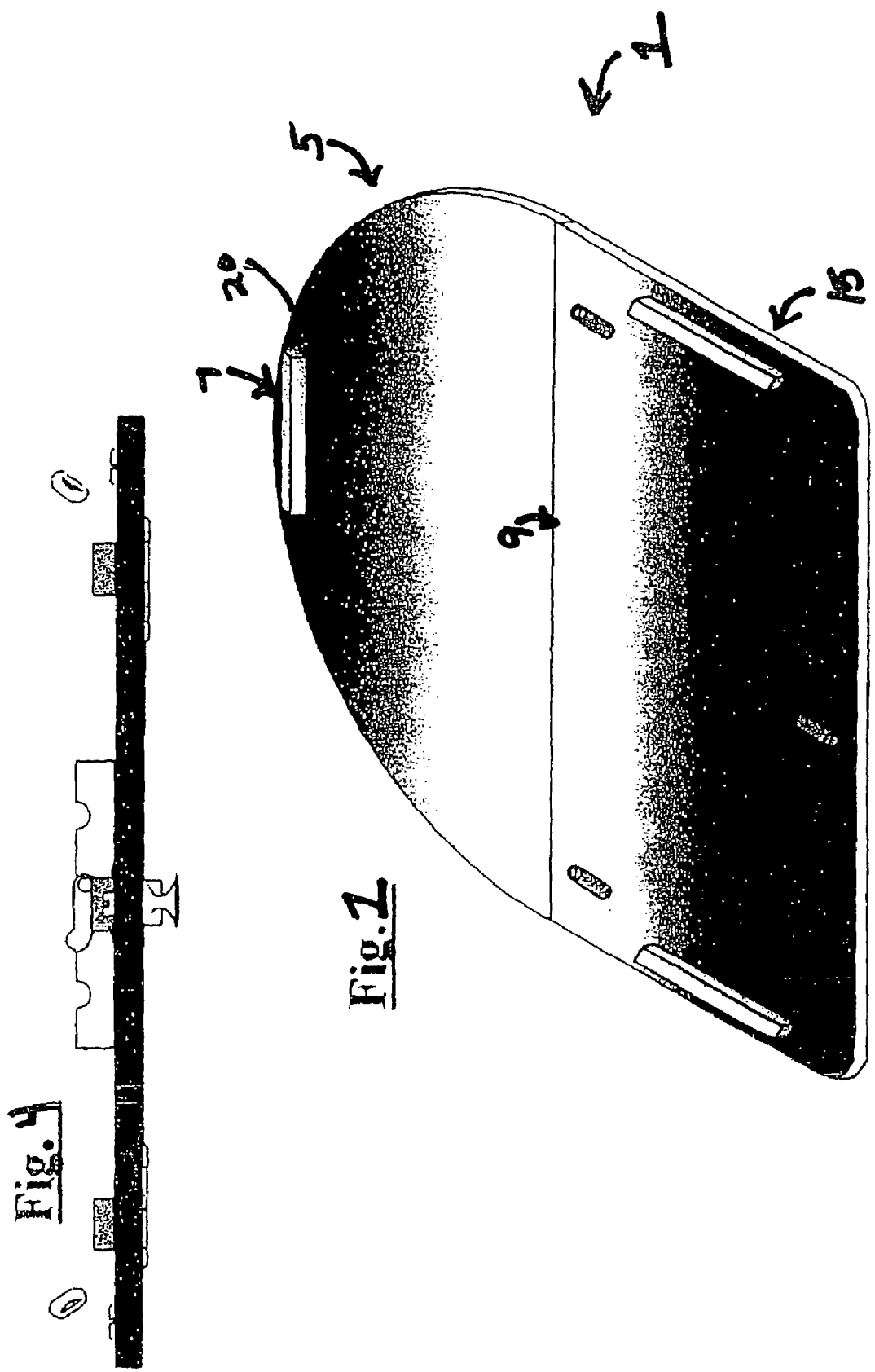

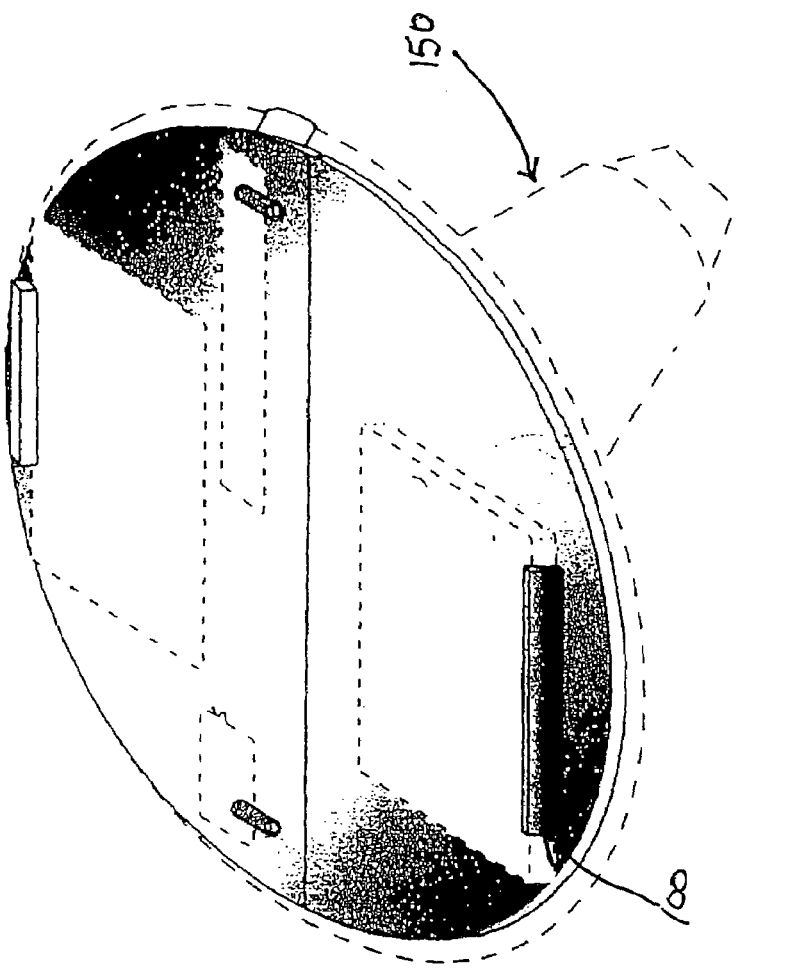
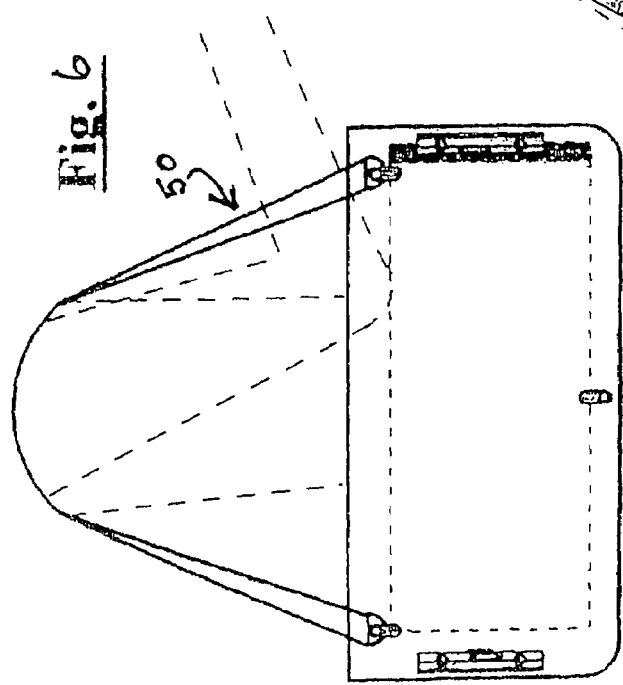
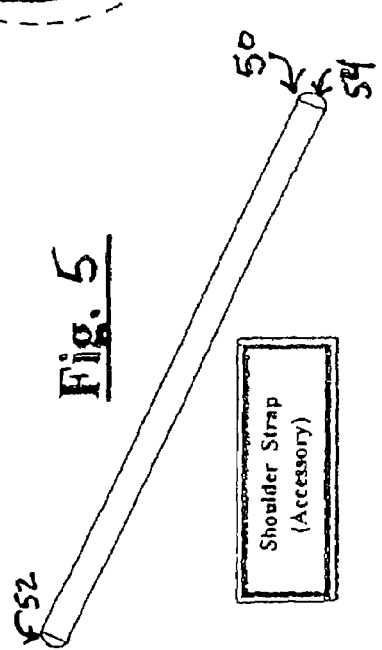

"Car Passenger Style Board"

US 7,469,871 B2

UNIVERSAL CLIPBOARD

I. BACKGROUND OF THE ART

A. Field of Invention

This invention pertains to a clipboard, and specifically, a portable clipboard adapted for use both inside and outside a vehicle, being provided with means for securely but removably mounting the clipboard to the steering wheel of an associated vehicle, so that a motorist is provided with a sizeable writing tablet, as well as a place to clip papers, maps, and the like. Moreover, the clipboard of the present invention can be easily removed from the vehicle for use anywhere a clipboard is necessary, being additionally provided with a removable shoulder strap for carrying the clipboard over the user's shoulder or arm and retention clips for retaining writing utensils.

Clipboards modified for use on vehicle steering wheels are known in the art and have presented themselves useful devices. However, the existing devices tend to be useful only in the vehicle, when attached to the steering wheel or column and are often designed in such a way as to have its useful features arranged in one direction; namely the direction defined once the clipboard is placed on the steering wheel. Such clipboards are not as well suited for use outside the vehicle, being difficult to remove from the steering wheel or otherwise, not being appropriately designed for use in a warehouse or other similar location where clipboards are commonly found.

Accordingly, there remains a need for a clipboard that provides ample room for a writing surface when used in association with a steering wheel, and which can be securely, but easily attached to the steering wheel, but which is also removable and suitably designed for being carried and used outside the vehicle.

B. Description of the Related Art

There are a wide variety of clipboards available, including clipboards that are suitable for mounting in a vehicle or more specifically on a vehicle steering wheel. Many of the existing vehicle clipboards are difficult to remove from their mounting, if they are even removable at all. For sales and delivery people who are accustomed to routinely using a clipboard both in and out of their vehicle, difficulties in mounting and unmounting the clipboard can be exasperating and frustrating. Moreover, many existing clipboards are too small to provide sufficient writing room and room for storing a variety of articles and materials, such as papers, business cards, maps, writing utensils, calculators, and the like. Increasing the size of a clipboard, without making it collapsible, however, can mean a bulky clipboard that is difficult to carry around.

Additionally, existing clipboards do not provide means for keeping the clipboard close at hand. Often clipboards are set down in a factory or elsewhere in order to free the user's hands. This can result in the misplacement or loss of the clipboard.

The clipboard of this invention solves many problems in existing clipboards, being adapted for quick, easy and secure mounting to a steering wheel by means of a simply elastic band, being comprised of two hinged portions that can be unfolded to provide a large writing surface or folded to provide a standard writing surface, being provided with a shoulder strap that may be removable so that the clipboard can be closely kept next to the user, having multiple retention clips and strap clips for holding materials, and having a latch for keeping the clipboard in the folded position.

The present clipboard solves many problems found in existing clipboards while being simple to manufacture.

II. SUMMARY OF THE INVENTION

According to one aspect of the present invention, an improved clipboard is provided, which may be removably mounted onto a vehicle steering wheel by means of an elastic strap.

According to another aspect of the present invention, the clipboard is collapsible, by folding it in half.

According to another aspect of the present invention, the clipboard has multiple retention clips for use in multiple directions.

According to yet another aspect of the present invention, the clipboard is provided with latching means to keep the clipboard securely folded.

According to another aspect of the present invention, the clipboard is provided with a shoulder strap for carrying the clipboard outside of the vehicle.

According to another aspect of the present invention, the shoulder strap is removable and can be stored with the clipboard by the retention clips.

According to another aspect of the present invention, the clipboard can be quickly unfolded and secured to the steering wheel.

According to another aspect of the present invention, the clipboard can be quickly removed from the steering wheel, securely collapsed and carried by means of the shoulder strap.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 1 a plan view of one embodiment of the universal clipboard in accordance with the present invention.

FIG. 4 is an end view of the universal clipboard depicted in FIG. 1 as from the top edge up the upper writing portion.

FIG. 5 is a view of the shoulder strap used in conjunction with the universal clipboard of the present invention.

FIG. 6 is a view of the universal clipboard with the shoulder strap attached.

FIG. 9 is a view of one embodiment of the universal clipboard as installed on a vehicle steering wheel.

IV. DESCRIPTION OF THE PREFERRED EMBODIMENTS

Figure 3:
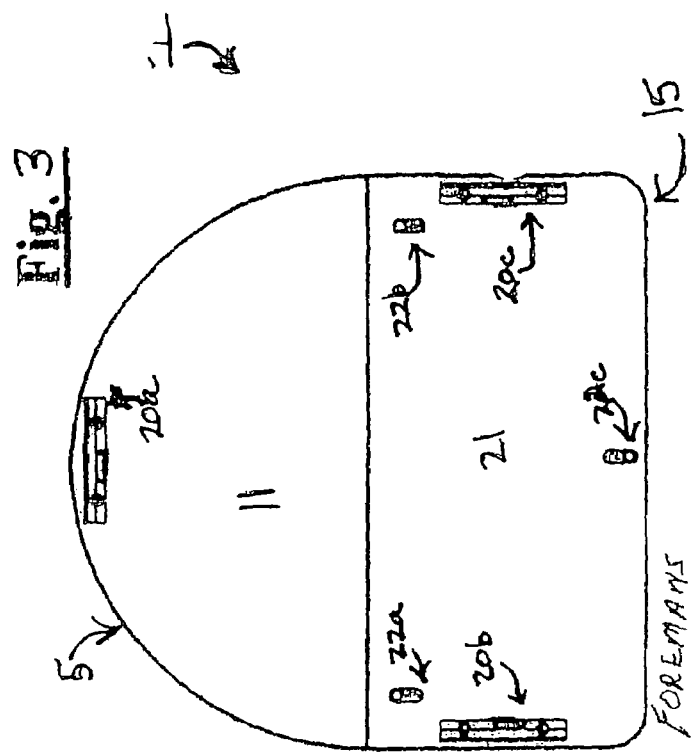
FIG. 3 shows an alternate view of the top of the universal clipboard depicted in FIG. 1.
Figure 2:
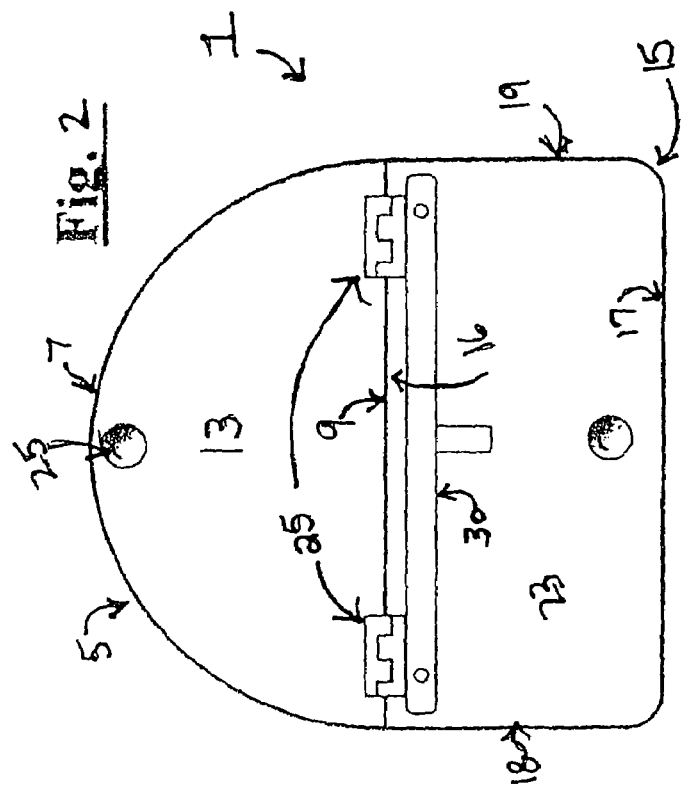
FIG. 2 shows a view of the underside of the universal clipboard depicted in FIG. 1.

Referring now to the drawings wherein the showings are for purposes of illustrating a preferred embodiment of the invention only and not for purposes of limiting the same, FIGS. 1-3 shows a clipboard 1 in accordance with one embodiment of the present invention. The clipboard 1 is comprised of an upper writing portion 5 and a lower writing portion 15. The upper and lower writing portions 5, 15 of the clipboard 1 may be constructed of any substantially rigid, natural or manmade material selected with sound engineering judgment, including, but not limited to plastic, wood, and metal. The upper and lower writing portions 5, 15 may have a thickness of approximately ⅛ to ½ inches and may have an approximately constant thickness.

The upper writing portion 5 may be approximately semicircular, wherein the upper edge 7 of the upper writing portion 5 may be generally arcuate and where the lower edge 9 of the upper writing portion 5 may be generally straight, so that the upper edge 7 and lower edge 9 of the upper writing portion 5 form a semicircle. While, in this embodiment, the upper portion 5 of the clipboard 1 may be semicircular, in another embodiment, the upper portion 5 may be approximately quadrilateral or any other shape, having more than two edges. The circumference defined by the arc of the upper edge 7 of the upper writing portion 5 may be selected to be approximately equal to the circumference of an associated steering wheel (shown as 150 in FIG. 9).

Figure 10:
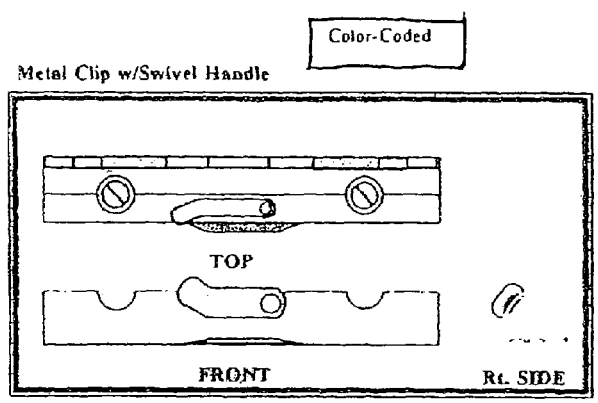
FIG. 10 is a view of one embodiment of a clip used on the clipboard according to the present invention.

The upper writing portion 5 of the clipboard 1 has a front face 11 and a rear face 13. The front face 11 of the upper writing portion 5 may be provided with at least a first retention retention clip 20a adapted to receive a writing instrument such as a pen or pencil. The retention retention clip 20a may also be adapted to store a shoulder strap 50 (discussed below). Moreover, the retention clip 20a may be adapted to hold paper or other similar materials to the clipboard 1. In one embodiment, the retention clip 20 is provided with a spring and is spring biased in a closed position to hold materials to the clipboard 1, such as is shown in FIG. 10. The retention clip 20a may be fixedly attached to the front face 11 of the upper writing portion 5 of the clipboard 1 by any means selected with sound engineering judgment, including screws, adhesives, and welding.

Figure 11:
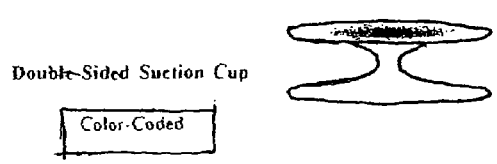
FIG. 11 is a view of one embodiment of a latch means used on the clipboard according to the present invention.

The rear face 13 of the upper writing portion 5 of the clipboard 1 may be provided with a latching means 25 for maintaining the upper and lower portions 5, 15 of the clipboard 1 in a securely closed position when the clipboard 1 is not mounted on an associated steering wheel. The latching means 25 may be a hook and eye latch, wherein the hook is located on the upper writing portion 5 and the corresponding eye is located on the lower writing potion 15. Alternatively, the latching means may be two double sided suction cups, such as are shown in FIG. 11, one placed on the upper writing portion 5 and the second placed on a corresponding spot of the lower writing portion 15. By corresponding spot, it is meant that the suction cup may be placed in a position so that its face matches the face of the suction cup placed on the upper writing portion 5. In this way, the two opposing suction cup faces may, upon placement of pressure in closing the clipboard, removably affix to each other. Any other latching means 25 for securing the upper and lower writing portions 5, 15 of the clipboard 1 together may be used with sound engineering judgment.

In one embodiment, the lower writing portion 15 may have an approximately quadrilateral shape and may be approximately square or rectangular, having upper and lower edges 16, 17 and two side edges 18, 19. The length and width of the lower writing portion 15 may be selected to allow sufficient room for a piece of paper. In this respect, the length of the lower writing portion, from side edge 18 to side edge 19 may be at least approximately 10 inches and the width of the lower writing portion 15, from the upper edge 16 to the lower edge 17 may be at least approximately 10 inches. The dimensions of the upper and lower writing portions 5, 15 may be larger to accommodate larger steering wheels.

The upper edge 16 of the lower writing portion 15 may have the approximately the same length as the lower edge 9 of the upper writing portion 5. In another embodiment, shown in FIGS. 7-8, the lower writing portion 15 may have a semicircular shape defined by a lower edge 17 and upper edge 16, wherein the lower edge 17 of the lower writing portion 15 may be generally arcuate and where the upper edge 16 of the lower writing portion 15 may be generally straight. In this embodiment, the lower writing portion 15 may have approximately the same dimensions as the upper writing portion 5. The circumference defined by the arc of the lower edge 17 of the lower writing portion 15 may be selected to be approximately equal to the circumference of an associated steering wheel (shown as 150 in FIG. 9).

The lower writing portion 15 of the clipboard 1 has a front face 21 and a rear face 23. The front face 11 of the upper writing portion 5 may be provided with at least a second retention clip 20b, which may be substantially the same as the retention clip 20a located on the upper writing portion 5. In another embodiment, the lower writing portion 15 may have at least a third retention clip 20c, which may be substantially the same as the retention clip 20a located on the upper writing portion. The at least a second retention clip 20b may be located adjacent one edge 18 of the lower writing portion 15, approximately centered along the one side edge 18. The at least a third retention clip 20c may be located adjacent the second side edge 19 of the lower writing portion 15, approximately centered along the second side edge 19.In this way, there may be provided a flat writing surface between the second and third clips 20b, 20c. The second and third clips 20b, 20c may be fixedly attached to the front face 121 of the lower writing portion 15 of the clipboard 1 by any means selected with sound engineering judgment, including screws, adhesives, and welding.

The front face 21 of the lower writing portion 15 of the clipboard 1 may also be provided with at least first and second strap clips 22a, 22b. The first strap clip 22a may be located less than approximately 3 inches from each of the one side edge 18 and the upper edge 16 of the lower writing portion 15. The second strap clip 22b may be located less than approximately 3inches from each of the second side edge 19 and the upper edge 16 of the lower writing portion 15.

The first and second strap clips 22a, 22b may be adapted for receiving one of each of the two ends 52, 54 of a shoulder strap 50 (see FIGS. 5 and 6). The shoulder strap 50 may be a piece of material having a suitable length to provide for carrying the clipboard 1 by the shoulder strap 50 placed over the user's shoulder when the shoulder strap 50 is connected to the clipboard 1 via the first and second strap clips 22a, 22b. In one embodiment, the shoulder strap 50 is comprised of a piece of material having a length of between approximately five (5) inches and approximately thirty (30) inches and being provided with rings at each end. The rings may be sewed to the shoulder strap 50 at its ends 52, 54. The rings may be of a suitable size and shape so as to work in conjunction with the strap clips 22a, 22b in such a way that the shoulder strap 50 may be secured to the clipboard 1. The shoulder strap 50 may be made of any material selected with sound engineering judgment. In the same way, any means of providing for the shoulder strap 50 to be removably clipped to the clipboard 1 may be selected with sound engineering judgment. The shoulder strap 50 may be adjustable in length. The shoulder strap 50 may be fixedly attached to the clipboard 1; however, in the preferred embodiment, the shoulder strap 50 is removable so that it does not get in the way when the clipboard 1 is in use with the steering wheel. In this embodiment, the shoulder strap 50 may be removed, folded up and stored by being secured to the clipboard by one of clips 20a, 20b or 20c.

Returning to FIG. 3, the front face 21 of the lower writing portion 15 may be provided with addition strap clips 20c. The strap clips 22a, 22b, 22c, may be adapted to hold materials, such as papers, to the clipboard 1 when they are not being used with the shoulder strap 50. Strap clips 22a, 22b, 22c, may also be provided elsewhere on the front faces 11, 21 of the upper and lower writing portions 5, 15 of the clipboard 1 (see FIG. 9).

Figure 12:
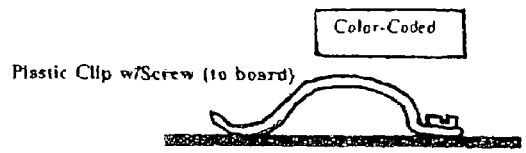
FIG. 12 is a view of one embodiment of a strap clip used on the clipboard according to the present invention.

As shown in FIG. 12, in one embodiment, the strap clips 22a, 22b, 22c may be constructed of an undulating or S-shaped piece of plastic pivotably secured to the clipboard 1 at its end, by a rivet, screw or any other means. In this way, the strap clip 22 may pivot to hold materials and papers to the clipboard 1.

The rear face 23 of the lower writing portion 15 may be provided with an elastic member 30 adapted to be placed over the steering wheel when the clipboard 1 is installed on the steering wheel, such as is shown in FIG. 9. The elastic member 30 may be fixed at each of its ends to the rear face 23 of the lower writing portion 15. The elastic member 30 may extend from approximately the one edge 18 to the second edge 19 of the lower writing portion 15. The elastic member 30 may be located adjacent to upper edge 16 of the lower writing portion 15. In this way, the elastic member 30 may be located approximately at the center of the clipboard 1 when the clipboard 1 is installed on the steering wheel.

In an alternate embodiment, the elastic member 30 may be located adjacent to the lower edge 9 of the upper writing portion 5. In this embodiment, the elastic member 30 may extend approximately the length of the lower edge 9 of the upper writing portion 5. In this way, the elastic member 30 may still be located approximately at the center of the clipboard 1 when the clipboard 1 is installed on the steering wheel.

The upper and lower writing portions 5, 15 of the clipboard 1 may be hingedly affixed to each other by means of first and second hinges 25 located at the lower edge 9 of the upper writing portion 5 and the upper edge 16 of the lower writing portion 15, preferably on the rear face 13, 23 of the upper and lower writing portions 5, 15. In this way, the clipboard 1 may be folded in half when not installed on the steering wheel, as shown in FIG. 6, with the two rear faces 13, 23 facing each other. This leaves the front faces 11, 21 of the clipboard 1 exposed for writing on or storing materials when the clipboard 1 is folded.

Figure 8:
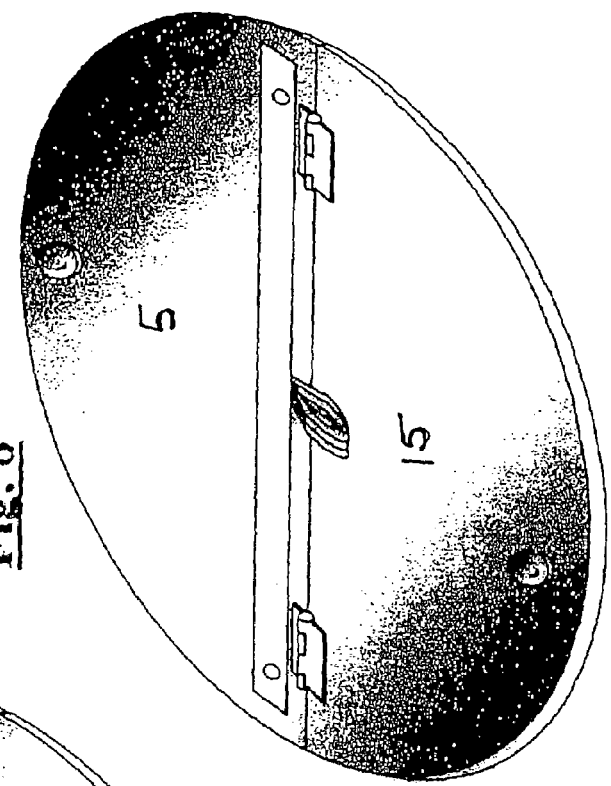
FIG. 8 is a view of the underside of the universal clipboard depicted in FIG. 7.
Figure 7:
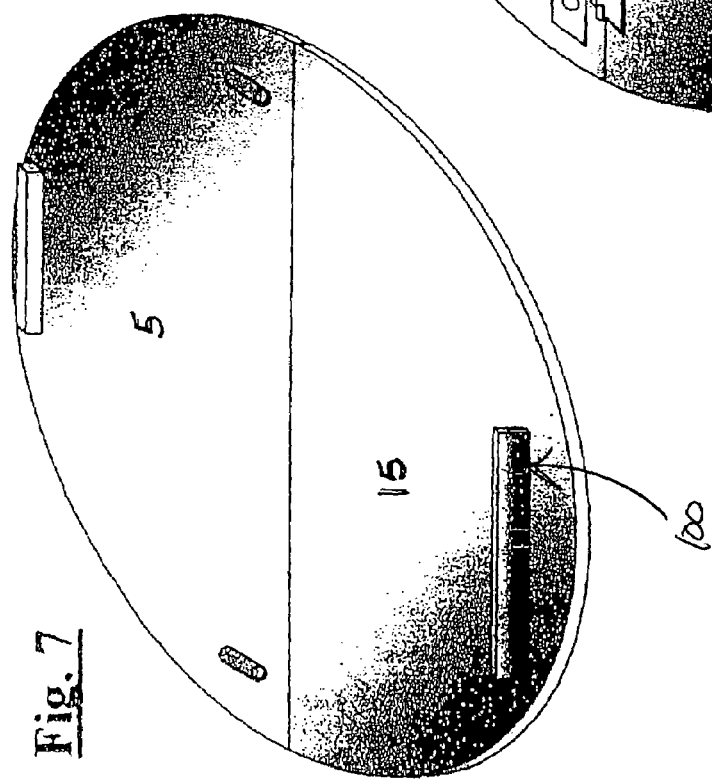
FIG. 7 is a view of the top of an alternate embodiment of the universal clipboard in accordance with the present invention.

FIGS. 7 and 8 depict an alternative embodiment of the present invention. FIGS. 7 and 8 depict the front and rear views of a clipboard 1 comprised of semi-circular upper and lower writing portions 5, 15. In this embodiment there may or may not be included a shoulder strap 50. In this embodiment there may be provided a ledge 100, shown in FIGS. 7 and 9 extending from the lower writing portion 5, for supporting materials, such as a book, when the clipboard is installed. The ledge 100 may be adapted to receive a writing utensil such as by having a clip or an indentation sized to receive a standard pen or pencil.

FIGS. 6 and 9 depict the clipboard 1 of the present invention in its installed state on a steering wheel and in its portable state, being carried with the should strap 50. To install the clipboard 1 on a steering wheel, the upper and lower writing portions 5, 15 are unfolded. The rear of the clipboard 1 is set against the steering wheel with the elastic member 30 extending over the steering wheel toward the steering column. In this way, the clipboard may be easily and removably placed over the steering wheel. The shoulder strap 50 may be folded and secured by one of the clips 20 on the clipboard 1.

When it is desirable to take the clipboard 1 out of the vehicle, it may be slipped off of the steering wheel and folded in half, with the rear faces 13, 23 of the upper and writing portions 5, 15 together. The upper and writing portions 5, 15 may be secured together by the latch means 25 so that the clipboard 1 remains folded. The shoulder strap 50 may be unclipped from its storage position in on of the clips 20. One end of the strap 50 may be secured in on strap clip 22a and the other end of the shoulder strap 50 may be secured in another strap clip 22b. Writing instruments and papers may be secured to the clipboard 1 by means of the clips 20 or any remaining strap clips 22. The clipboard 1 may be carried from the vehicle be placement of the shoulder strap 50 over the shoulder of the user. In this way, the clipboard 1 can remain with the user and the user's hands can remain free.

FIG. 4 is an edge view of a clipboard 1 in accordance with the present invention and shows the latch means 25 where the latch means is a double-sided suction cup.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A portable clipboard for use with an associated vehicle steering wheel, the clipboard comprising:
   an upper writing portion, having a lower edge and an upper edge, and front and rear faces; wherein the upper edge is arcuate and the lower edge is substantially straight, and wherein the lower edge has a length of between approximately 10 inches to approximately 18 inches;
   a lower writing portion, having a lower edge, an upper edge, first and second side edges and front and rear faces; wherein the lower writing portion is substantially rectangular, and wherein the first and second side edges have a length of between approximately 10 to 14 inches and the lower and upper edges have a length of between approximately 10 and 18 inches;
   wherein the upper and lower writing portions are hingedly connected to each other by at least first and second hinges located at the lower edge of the rear face of the upper writing portion and the upper edge of the rear face of the lower writing portion;
   a removable shoulder strap having a length that is adjustable;
   at least first and second strap clips adapted to receive the ends of the shoulder strap, located on the front face of the lower writing portion; wherein the strap clips are located less than approximately 3 inches from each of the side edges of the lower writing portion;
   at least first and second retention clips located on the front face of the lower writing portion and at least a third retention clip located on the front face of the upper writing portion; wherein said first, second and third retention clips are provided with a spring and is spring biased in a closed position to hold materials to the clipboard;

wherein when the shoulder strap is removed, the shoulder strap can be stored by the retention clips;

latch means for selectively latching the upper and lower writing portions in a closed position when the clipboard is not mounted on said associated steering wheel; wherein said latch means includes a hook located on the front face of the upper writing portion and a corresponding eye latch is located on the front face of the lower writing portion to receive the hook to secure the clipboard in the closed position; and an elastic member located on the rear face of the lower edge of the rear face of the lower writing portion; wherein the elastic member is fixed at each of its ends to the rear face of the lower writing portion and wherein the elastic member is located approximately at the center of the clipboard when the clipboard is installed on the steering wheel and adapted to extend over a portion of the vehicle steering wheel generally toward a steering column while the clipboard is rested against the vehicle steering wheel to removeably couple the clipboard to the vehicle steering wheel.

* * * * *